Sept. 7, 1965

F. W. FENTON 3,204,270

DOCK RAMP

Filed Aug. 14, 1962

INVENTOR.
FRANK W. FENTON
BY Ralph W. Kalish

ATTORNEY

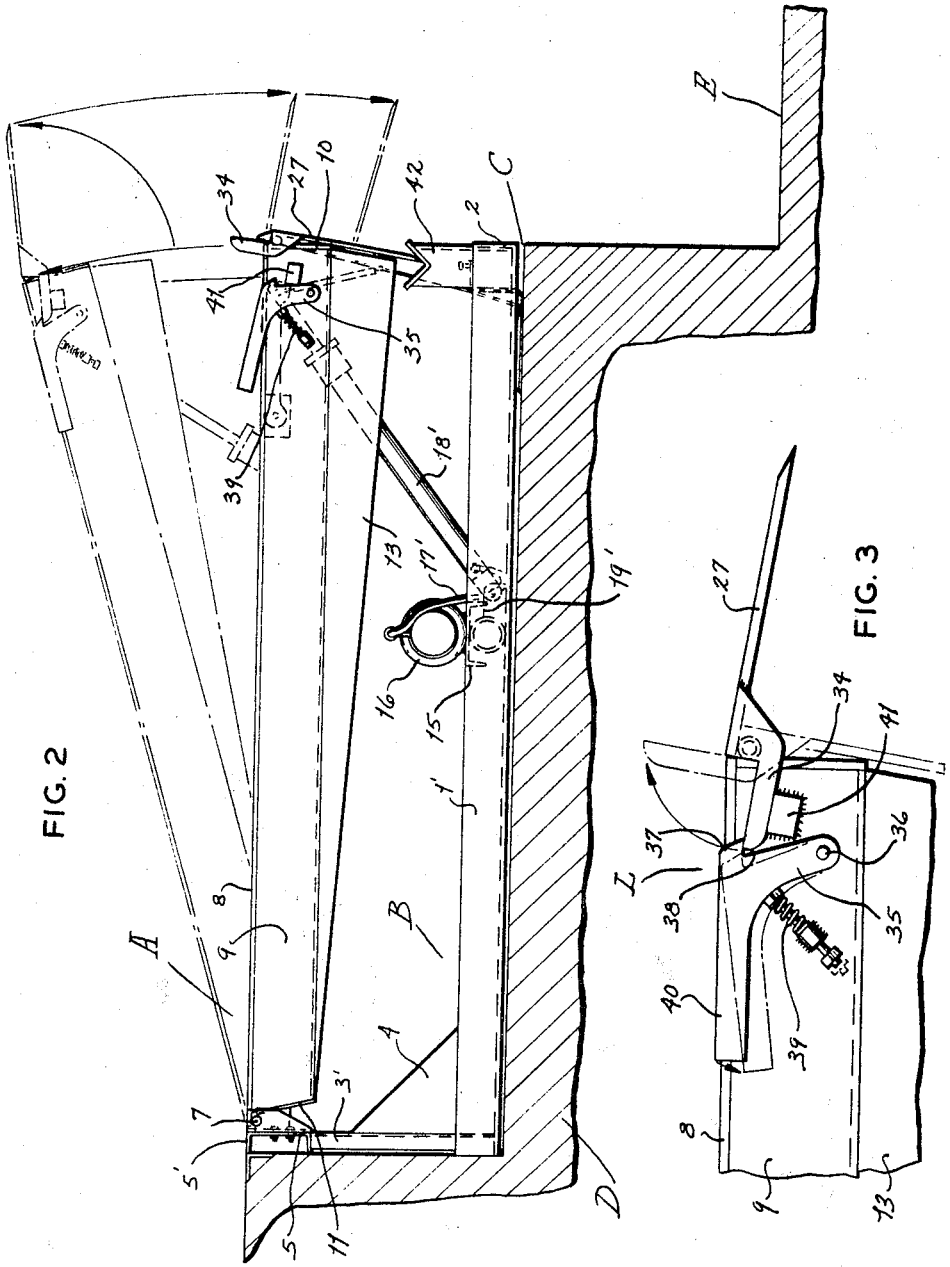

Sept. 7, 1965      F. W. FENTON      3,204,270
DOCK RAMP

Filed Aug. 14, 1962      4 Sheets-Sheet 3

INVENTOR.
FRANK W. FENTON
BY
ATTORNEY

Sept. 7, 1965
F. W. FENTON
3,204,270
DOCK RAMP
Filed Aug. 14, 1962
4 Sheets-Sheet 4
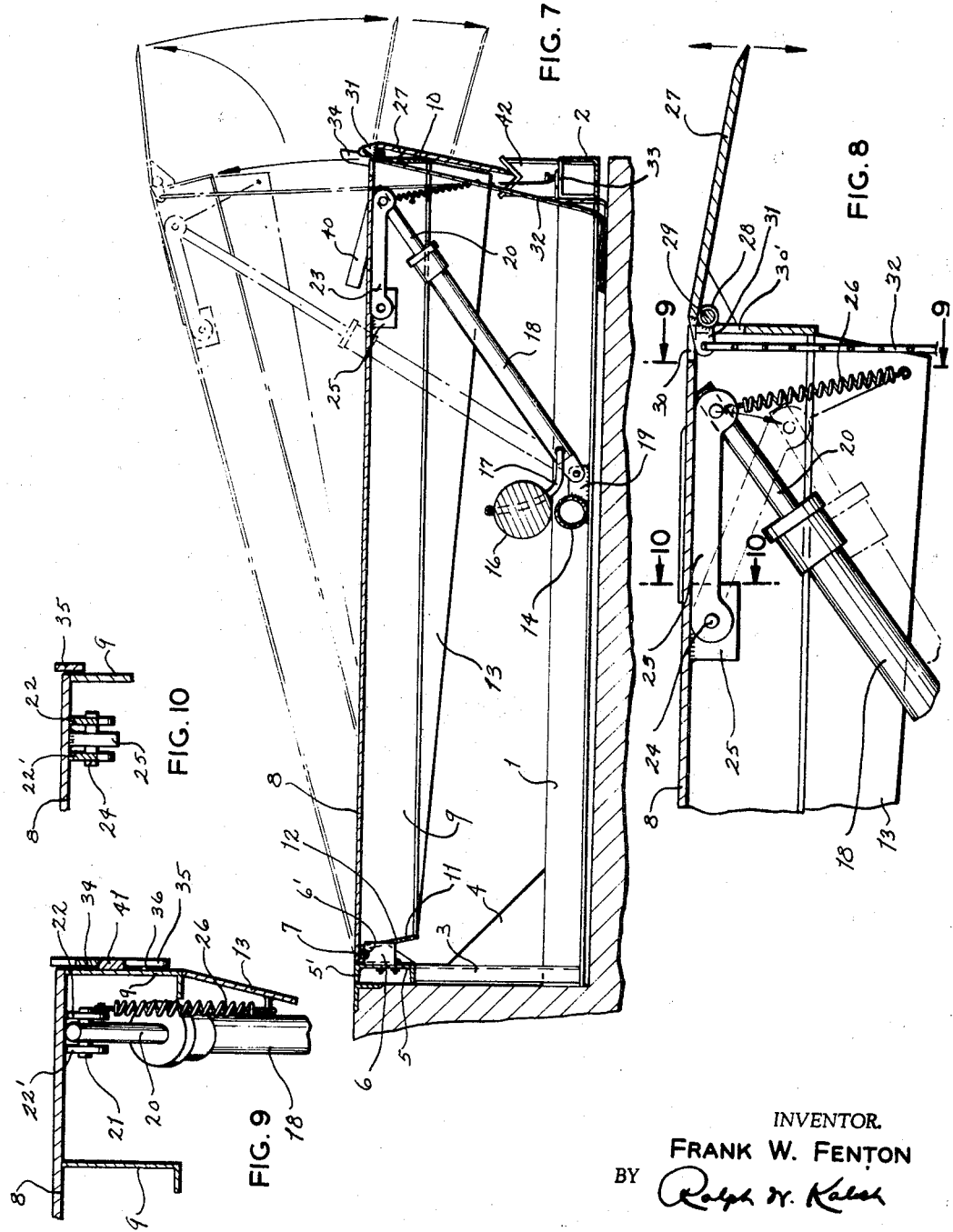
INVENTOR.
FRANK W. FENTON
BY Ralph N. Kalish
ATTORNEY

United States Patent Office 3,204,270
Patented Sept. 7, 1965

3,204,270
DOCK RAMP
Frank W. Fenton, Lemay, Mo., assignor to Beacon Machinery, Inc., St. Louis, Mo., a corporation of Missouri
Filed Aug. 14, 1962, Ser. No. 216,818
9 Claims. (Cl. 14—71)

This invention relates in general to materials handling equipment and, more particularly, to certain new and useful improvements in dock ramps.

It is an object of the present invention to provide a dock ramp for use with loading platforms which incorporates a novel lip construction adapted for swingable movement between inoperative position, wherein it hangs downwardly in non-obstructing manner, and operative or extended relation for disposition upon a truck bed to bridge the distance between same and the roll-over surface of the dock ramp.

It is another object of the present invention to provide a dock ramp incorporating a swingably mounted lip and having unique means for effecting swinging of said lip into operative position; and having locking means for maintaining said lip securely in such position.

It is an additional object of the present invention to provide a dock ramp adapted for vertical swingability by hydraulic or like means, and incorporating a free-floating mounting whereby the ramp may freely, compensatingly adjust to height differentials between the truck bed and the associated loading platform, as such differentials may develop during unloading action.

It is a still further object of the present invention to provide a dock ramp of the character stated which embodies a relatively shallow frame, being designed for disposition upon a prepared stationary base located above a road bed; which dock ramp incorporates a marked simplicity of parts, rendering same resistant to breakdown; which dock ramp may be most economically manufactured; and which dock ramp is reliable and durable in usage.

Other objects and details of the invention will be apparent from the following description when read in connection with the accompanying drawing (four sheets) wherein:

FIGURE 2 is a vertical transverse sectional view taken on the line 2—2 of FIGURE 1.

FIGURE 3 is an enlarged fragmentary side view of the lip locking mechanism.

FIGURE 7 is a vertical transverse sectional view taken on the line 7—7 of FIGURE 4.

FIGURE 8 is an enlarged fragmentray transverse sectional view taken substantially on the line 7—7 of FIGURE 4 but illustrating the relationship of the hydraulic cylinder and piston to the roll-over surface.

FIGURE 9 is a vertical transverse sectional view taken on the line 9—9 of FIGURE 8.

FIGURE 10 is a vertical transverse sectional view taken on the line 10—10 of FIGURE 8.

Figure 1:
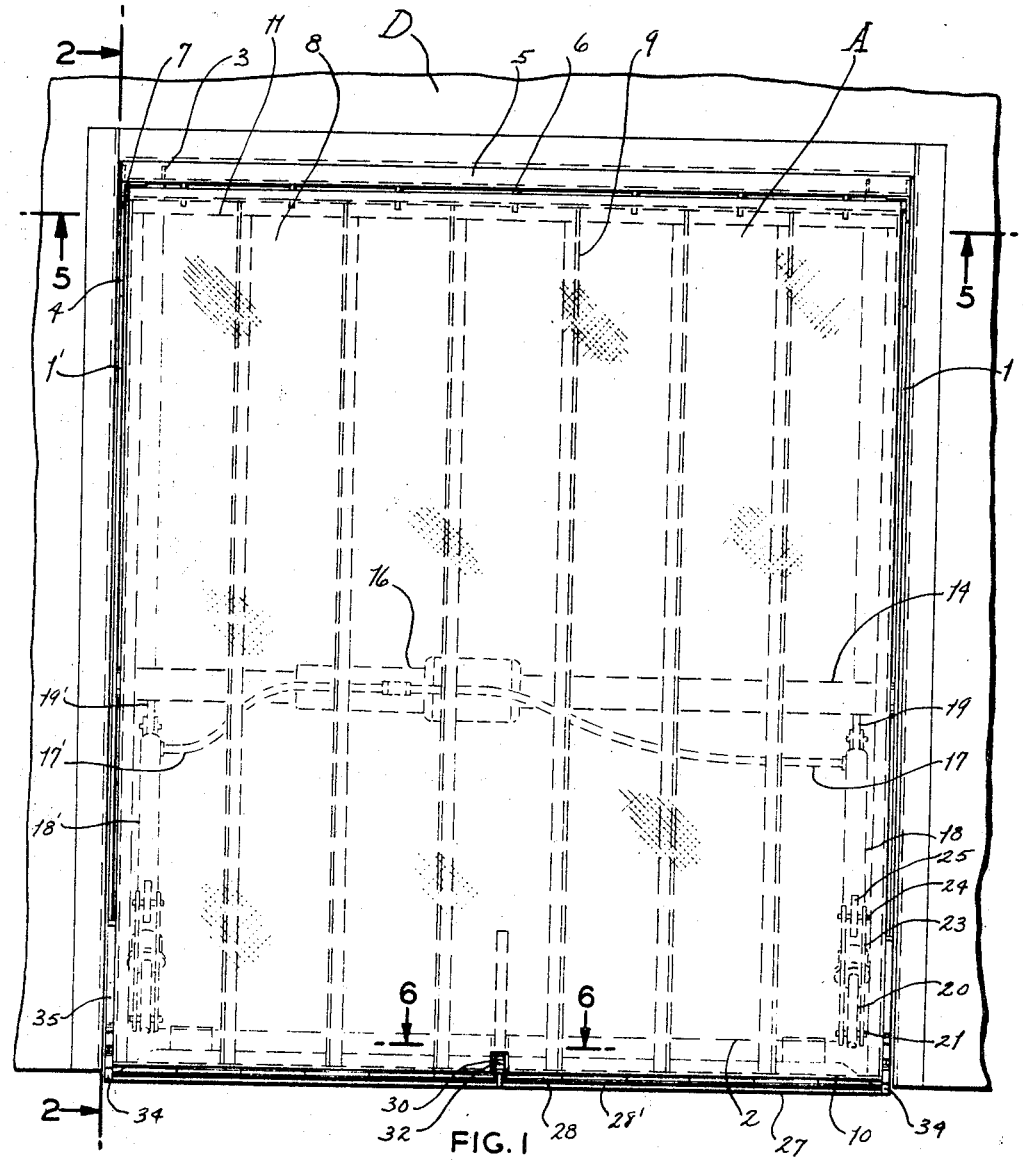
FIGURE 1 is a top plan view of a dock ramp constructed in accordance with and embodying the present invention.
Figure 4:
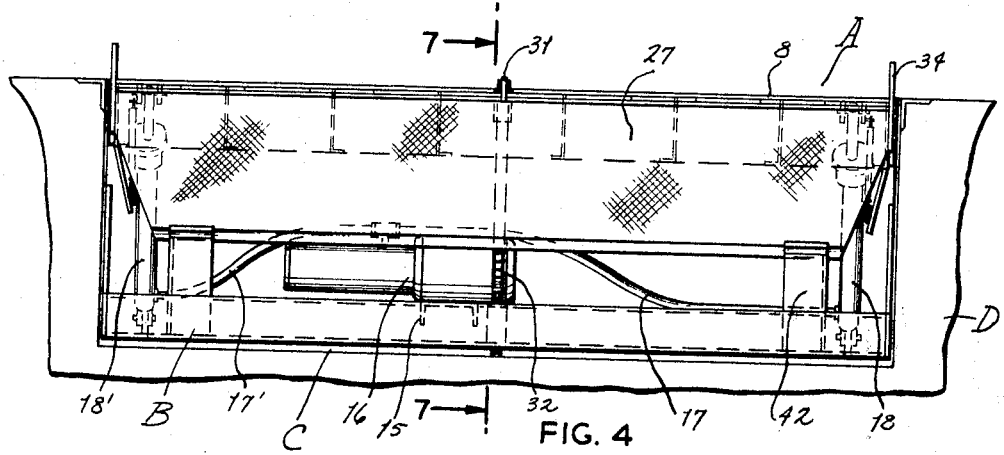
FIGURE 4 is a front end view.
Figure 5:
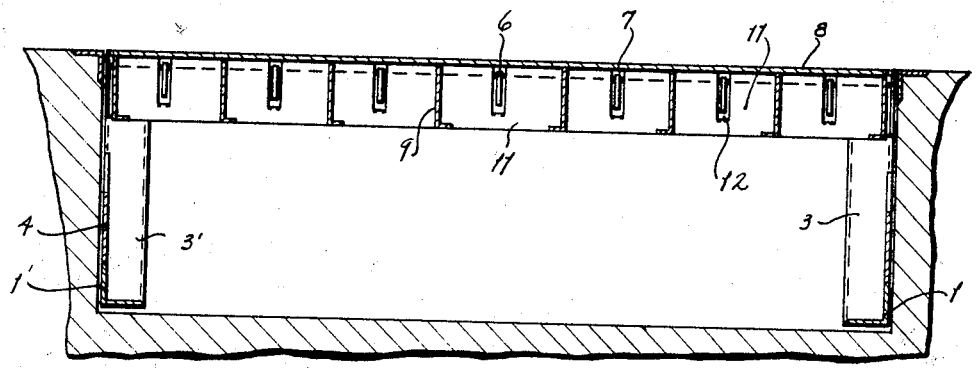
FIGURE 5 is a horizontal transverse sectional view taken on the line 5—5 of FIGURE 1.
Figure 6:
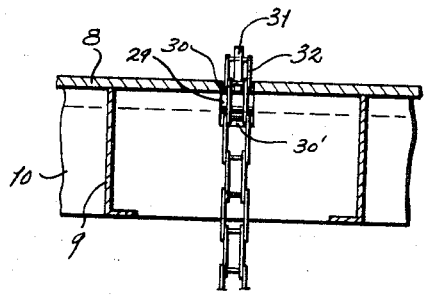
FIGURE 6 is a horizontal transverse sectional view taken on the line 6—6 of FIGURE 1.

Referring now by reference characters to the drawings which illustrate the preferred embodiment of the present invention, A designates generally a dock ramp having a frame B adapted for mounting within a suitably prepared, as of concrete, shallow pit or recess C formed in a loading platform D, of the type customarily associated with warehouses, factories, and other industrial and commercial establishments; said pit C being in elevated relation to the ground, road bed, or other support surface indicated at E, upon which a vehicle will be positioned with respect to platform D and dock ramp A for loading or unloading purposes. The depth of pit C may be of desired extent, but in actual practice a depth of about two feet has proved quite satisfactory.

Dock ramp frame B comprises a pair of parallel base side or longitudinal members 1, 1', and a forward base transverse member 2 extending between said members 1, 1' and being rigid therewith; said base members 1, 1' and 2 are formed of suitably shaped material such as, for example, of angle stock. At their rearward ends, each side base member 1, 1' is welded or otherwise fixed to the lower end of the relatively short, rear uprights 3, 3', respectively, there being reinforcing gussets 4 for rigidifying the connection between said uprights 3, 3' and base members 1, 1'. At their upper ends, uprights 3, 3' are fixed to a rear cross member 5, as formed preferably of channel stock, and opening rearwardly. The upper flange 5' of said member 5 is surface aligned with the upper face of platform D. On its forward face, said cross member 5 mounts a plurality of spaced-apart, forwardly projecting hinge plates 6 extending throughout the length of said member 5 and being in planar normal relationship thereto. Each of said hinge plates 6 is provided with an upwardly opening arcuate recess 6' in their upper edges for supportingly receiving a hinge rod 7 which is rigidly secured throughout its length to the rearward end of the under-face of an enlarged plate 8, forming a roll-over surface which may have a raised surface pattern. Extending longitudinally of said plate 8 from a point just forwardly of rod 7 to the front end thereof, and in horizontally spaced relationship, is a plurality of formed reinforcing stringers 9 which at their forward ends are welded to a vertical front end or so-called cover member 10 extending the width of plate 8 and being secured in its upper edge to the under-face of the forward end of said plate 8. At their rearward ends, said stringers 9 are preferably forwardly and downwardly inclined and are fixed to a transverse rearward end or cover member 11, which is welded in its upper rearward portion to hinge rod 7 and on its upper end margin to the under-face of plate 8. Said member 11 is provided with a plurality of spaced-apart vertical openings 12 for partial extension therethrough of hinge plate 6 when said plate 8 is in lowered or horizontal position (see full lines in FIGURES 2 and 7). Thus, stringers 9 and front and rearward end members 10, 11 combine to provide a sturdy support frame for plate 8 to permit the movement of substantial loads thereacross, as in the order of twenty thousand pounds. Depending from the lower ends of each of the outer stringers 9 is a side skirt section 13, which, for safety purposes, inclines inwardly.

Extending cross-wise between, and secured at its ends to, frame base side members 1, 1', forwardly of the midpoints thereof, is a support member 14 which, if desired, may be of pipe stock. Said member 14, in addition to further stabilizing frame B, centrally carries a plate 15 for a motor and hydraulic pump unit indicated broadly at 16; said latter being connected by conduits or tubing 17, 17' extending laterally therefrom to the lower ends of hydraulic cylinders 18, 18', respectively. Said cylinders 18, 18' are pivotally mounted at their lower ends to lugs 19, 19' welded or otherwise fixed to opposite end portions of member 14 and extending forwardly therefrom, being also secured upon the horizontal flange of the adjacent side members 1, 1'. Thus, said cylinders 18, 18' are located at opposite sides of dock ramp A and are adapted for swingability in a vertical plane about their lower end pivots. Each cylinder 18, 18' mounts a cooperating piston 20, which at its outer or forward end is pivotally engaged, as by a cross pin 21, to the opposed side pieces 22, 22' of a composite arm 23; said latter at its rearward end is swingably mounted by a pin 24 to a lug 25 depending from, and fixed to, the under face of plate 8 (see FIGURE 10). As shown in FIGURE 8, composite arms 23 will accommodatingly swing about the related pins 24, as the associated piston 20 initiates its withdrawing or downward movement. Normally, arms 23 will abut against the under face of plate 8 (FIGURE 7) for application thereagainst of the driving force of the pistons during upward swinging movement of plate 8, and for maintaining same in selected position. An extension spring 26 is engaged at its upper rearward end to the forward end of each arm 23 and at its lower or forward end is secured to the inner face of the proximate side skirt 13 whereby said springs 26 create a downward bias upon the related arms 23 so as to urge same into downwardly swung relation at their forward ends, away from engagement with plate 8, for purposes presently appearing.

Hingedly mounted on front end member or cover 10 is a lip 27 extending substantially the width of plate 8; said lip having welded to its rearward under-surface a plurality of spaced-apart knuckles 28 for alternating relationship with cooperating knuckles 28' affixed to front cover 10 for extension through such aligned knuckles 28, 28' of a hinge rod 29. Thus, lip 27 is adapted for swingable movement between the downwardly extending or depending position, as shown in full lines in FIGURES 2 and 7, and outwardly extended or operative position, as shown in phantom lines in FIGURES 2 and 7, wherein it is substantially planar-wise aligned with plate 8 to form an effective extension thereof for bridging the distance between same and the bed of a vehicle disposed adjacent dock ramp A for loading or unloading purposes.

Plate 8 and front end or cover member 10 are provided with communicating openings 30, 30', respectively, midway the front edge of the former and midway the upper edge of the latter for movement therethrough of a lug 31 affixed at its normally forward end to the central knuckle 28 on lip 27, as well as being affixed to the adjacent rearward end edge of said lip 27 (see FIGURE 8). Engaged to the rearward or other end of lug 31 is a chain 32 which extends downwardly, with its lower end anchored to a hold-down bracket 33 provided centrally of transverse member 2 of frame B. Chain 32 is of a greater length than the distance between plate 8 and bracket 33 when said plate is in lowered or horizontal position (see FIGURE 7), so that upon upward swinging of plate 8 consequent to operation of hydraulic cylinders 18, 18', the chain will progressively lose its slack until plate 8 has been swung through such an arc that said chain will become taut. Thereupon, upon further upward swinging of plate 8, lip 29 will be caused to swing upwardly from the position shown in full lines in FIGURE 7 into substantially horizontal position as a result of the downward force applied thereon by the now fully extended chain 32. Thus, chain 32 acts to effect swinging of lip 27 between inoperative and operative positions.

For maintaining lip 27 in upwardly swung or operative relation, a locking mechanism, indicated generally L (see FIGURE 3), is provided at both sides of dock ramp A. Each mechanism L comprises an operating arm 34 extending rearwardly from the rearward edge portion of the opposite sides of lip 27 laterally outwardly of plate 8 between same and the adjacent wall of pit C; said operating arm 34 cooperating with a latch arm 35, which latter is pivotally mounted at its lower end, as at 36 on the outer side face of the proximate stringer 9. Said latch arm 35 on its forward or operating-arm-confronting face is rounded at its upper end to form a cam surface 37 for camming engagement with the rearward end of arm 34, and having an under-cut or downwardly opening shoulder 38 beneath such cam surface 37 for restraining engagement with the rearward end of operating arm 34 when locking mechanism L is in latched condition. An adjustable spring 39 mounted on the adjacent stringer 9 bears against the rearward side of latch arm 35 for biasing same into substantially vertical or forwardly swung condition at its upper end. Said latch arm 35 also integrally incorporates a rearward extension 40 substantially axially normal to said latch arm 35 and which, when locking mechanism L is in latched condition, will be substantially disposed in axial parallel relationship to plate 8 (FIGURE 3) so as not to extend obstructingly above the surface of said latter.

Referring to FIGURES 2 and 3, it will be seen that when lip 27 is in downward swung or inoperative position, operating arm 34 will project upwardly and latch arm 35 will be in maximum forwardly swung position with extension 40 projecting above plate 8. As lip 27 is elevated into horizontal position through operation of chain 32, as above described, operating arm 34 will, perforce, swing downwardly and into engagement with the cam surface 37, with the force of such downward movement causing latch arm 37 to be swung rearwardly against the pressure of spring 39 until operating arm 34 clears cam surface 37, thereby freeing latch arm 35 for forward swinging under bias of spring 39, which will effect engagement between under-cut 38 and operating arm 34 to thereby effect latching of locking mechanism L and securely maintain lip 27 in extended operating position. An abutment member 41 is secured on the adjacent stringer 9 for receiving on its upper surface operating arm 34 when the latter is in engaged condition.

It will thus be seen that disengagement of the component parts of locking mechanisms L may be readily effected by the application, through any suitable means of downward pressure upon extension 40 so as to cause rocking rearwardly of arm 35 and thus permit upward swinging of operating arm 34 with consequent downward pivoting of lip 27 for restoration into inoperative position.

As may be seen in FIGURES 2 and 7, a pair of lip supports 42 are presented upstandingly in spaced-apart relation upon front transverse member 2; each of said supports 42 having a generally V-shaped top surface for receiving the lower end of lip 27.

If desired, it is obvious that means may be provided for effecting manual raising of lip 27, such as by socket members (not shown) disposed on opposite sides of lip 2' for receiving lever rods or like implements.

From the foregoing the operation of dock ramp A should be apparent. However, in the normal inoperative position of said ramp A, lip 27 will be in downward depending position, as shown in full lines in FIGURE 2. A vehicle, such as a commercial truck, which is to be loaded or unloaded may be positioned with its bed confronting plate 8. The operator will then, through appropriate manipulations of remote controls, such as push buttons and the like, cause hydraulic fluid to flow through cylinders 18, 18' for outward extension of the related pistons 20, 20' for consequent upward swinging of plate 8 to a point which will be above the truck bed. As plate 8 reaches its upward limit of movement, lip 27 will be swung upwardly into operative position, in the manner fully described hereinabove, and as shown in phantom lines in FIGURE 2. This upward and outward swinging of lip 27 will thus be effected upwardly of the truck bed so that there will be no inadvertent interference with such movement. Thereon the operator will cause a flow of hydraulic fluid from cylinders 18, 18' to allow for downward swinging of plate 8 to cause lip 27 to be brought into supported or resting position upon the truck bed; it being recognized that lip 27 is locked in extended position through operation of lock mechanisms L, as above described. After lip 27 has been disposed upon the truck bed, the operator will continue to allow a flow of hydraulic fluid from cylinders 18, 18' which will thus cause conposite arms 23 to swing downwardly at their forward ends, causing compression of the related springs 26, as indicated in phantom lines in FIGURE 8. Thus, by this action, plate 8 and lip 27 are fully supported by the truck bed and thus are in what one might call a "free-floating" condition, so as to be readily swingable for accommodating any lowering or raising of the truck bed through unloading therefrom or loading thereon.

Upon termination of the operation in question, the operator will effect upward swinging of plate 8 to cause removal of lip 27 from the truck bed, and the vehicle may then be moved away. To unlock lip 27 the operator need merely effect depression of extension 40 of arm 35, as by foot pressure, which will thus free lip 27 for downward swinging, to be returned to resting position at its lower end within members 42 upon return of plate 8 to lowered or horizontal position.

It should be particularly recognized that lip 27 together with its supports 42 jointly form a front end support for plate 8 when the latter is in lowered position so as to present same in horizontal position, surface-wise aligned with the loading platform so as to present a continuous floor. Thus, lip 27, when in inoperative position, serves as a leg support to rigidify plate 8 in floor-forming disposition. When said plate is in lowered position, cylinders 18, 18' do not support same, but rather said plate is supported by the combination of lip 27 and its supports 42.

It should be understood that changes and modifications in the formation, construction, arrangement, and combination of the several parts of the dock ramp may be made and substituted for these herein shown and described without departing from the nature and principle of my invention. Having thus described my invention, what I claim and desire to secure by Letters Patent is:

1. A dock ramp comprising a frame, a platform forming a tread surface pivotally engaged along its rearward end for swingable movement between lowered and elevated positions, a lip hingedly fastened to the forward end of said platform for swingable movement between depending or inoperative position and extended or operative position, means for elevating and lowering of said platform, a lug affixed to said lip and extending rearwardly thereof, there being a slot provided in said platform for movement of said lug therethrough, linkage means connecting said lug to said frame for effecting swinging of said lip from inoperative to operative position in timed sequence to upward swinging of said platform, and locking means for maintaining said lip in operative position.

2. A dock ramp as defined in claim 1 and further characterized by said linkage means for swinging said lip comprising an elongated, flexible member secured at its lower end to said frame and at its upper end to said lug, said flexible member having a length greater than the distance between the point of securement of said member and the platform when the latter is in lowered position.

3. A dock ramp as defined in claim 1 and further characterized by said linkage means for swinging said lip comprising a chain anchored at its lower end to said frame and at its upper end to said lug, said chain having a length less than the distance between its point of securement at its lower end and said platform when the latter is in full upward position.

4. A dock ramp as defined in claim 1 and further characterized by said lip locking means comprising at least one operating arm fixed on said lip, and a latch arm pivotally engaged on said platform, said operating and latch arms being adapted for interengagement when said lip is in extended position.

5. A dock ramp as defined in claim 4 and further characterized by said operating arm extending rearwardly from said lip when said latter is in extended position, said latch arm having a shoulder on its forward face for engagement by said operating arm, and means for biasing said latch arm forwardly.

6. A dock ramp as defined in claim 5 and further characterized by an extension formed integrally with said latch arm for projection rearwardly therefrom to provide a lock release member.

7. A dock ramp as defined in claim 1 and further characterized by said platform elevating and lowering means comprising a pair of hydraulic cylinders pivotally mounted at their lower ends on said frame at opposite sides thereof, a piston slidably engaged in each cylinder, an arm pivotally mounted on the underface of said platform at opposite sides thereof, each piston engaged to the proximate arm.

8. A dock ramp as defined in claim 7 and further characterized by each of said arms being pivotally engaged at their rearward ends to said platform, and said arms being pivotally engaged at their forward ends to the outer ends of the related piston.

9. A dock ramp as defined in claim 8 and further characterized by means biasing said arms downwardly at their forward ends.

References Cited by the Examiner

UNITED STATES PATENTS

| | | | |
|---|---|---|---|
| 2,714,735 | 8/55 | Watson | 14—71 |
| 2,914,995 | 12/59 | Odell | 94—46 |
| 2,974,336 | 3/61 | Kelley | 14—71 |
| 3,117,332 | 1/64 | Kelley | 14—71 |

CHARLES E. O'CONNELL, *Primary Examiner.*

JACOB L. NACKENOFF, CHARLES E. O'CONNELL,
*Examiners.*